United States Patent Office 3,028,483
Patented Apr. 3, 1962

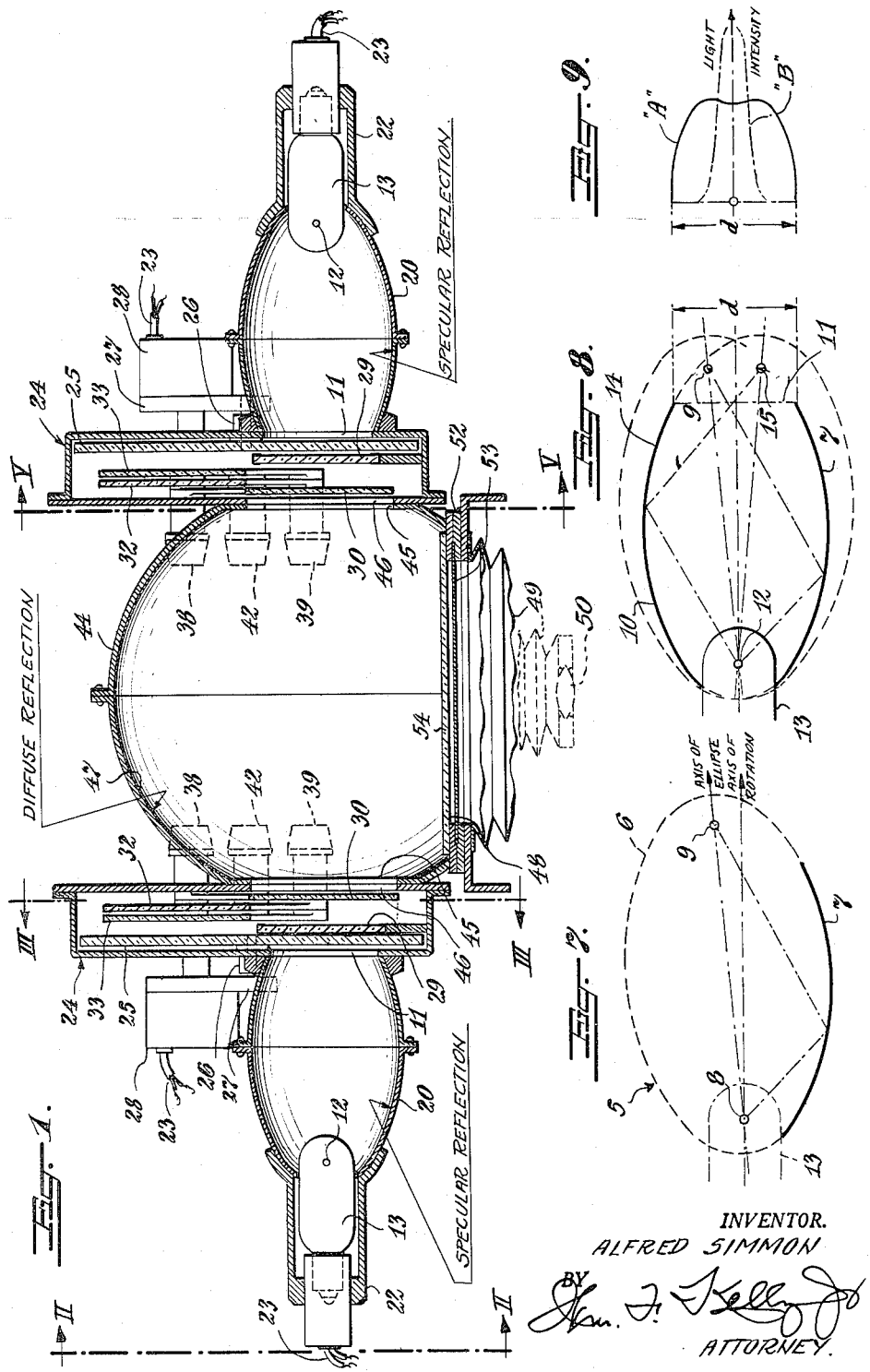

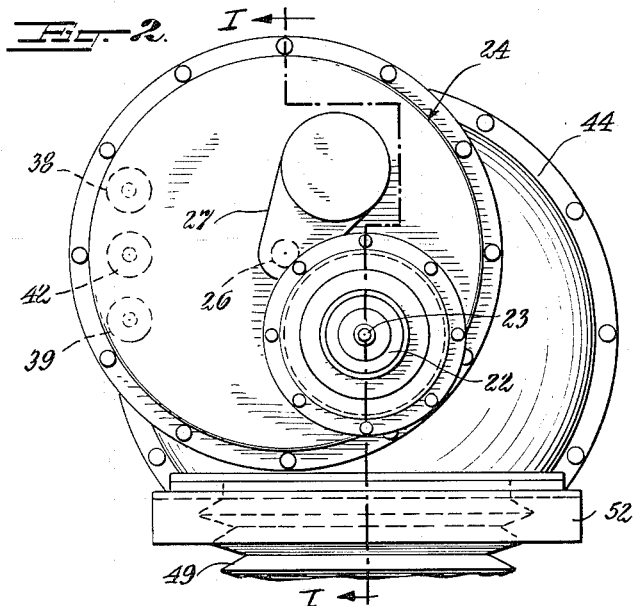
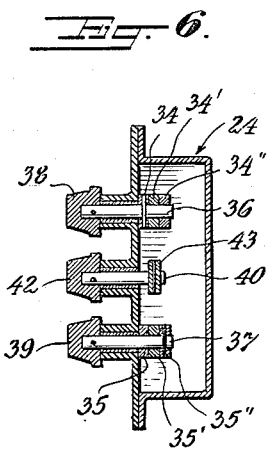
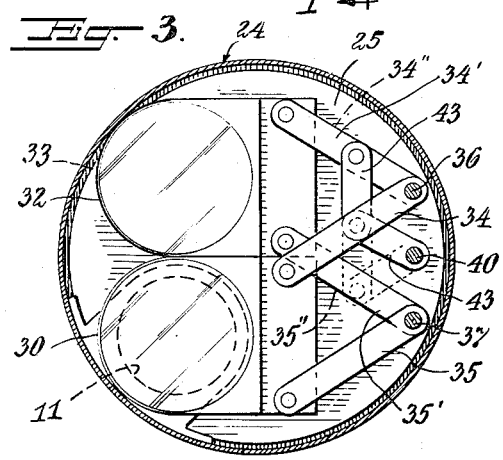
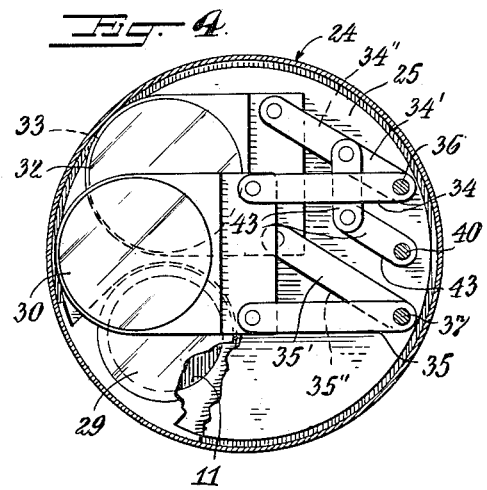
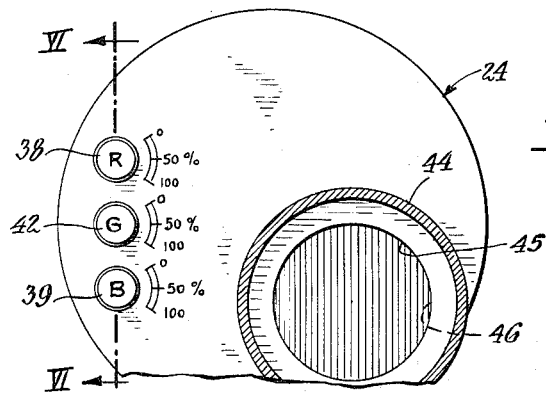
INVENTOR.
ALFRED SIMMON.
ATTORNEY.

3,028,483
ILLUMINATING APPARATUS FOR PHOTOGRAPHIC PRINTERS AND ENLARGERS
Alfred Simmon, Garden City, N.Y., assignor to Simmon Brothers, Inc., Long Island City, N.Y., a corporation of New York
Filed Feb. 9, 1959, Ser. No. 792,152
12 Claims. (Cl. 240—41.35)

The present invention relates to illuminating apparatus for the copying or enlarging of photographic negatives or transparencies, and especially to an apparatus where diffused light is used for this purpose. (The advantages of diffused light, as distinguished from specular light produced with the aid of condenser lenses, are well known and the effects of grain, dust, scratches and other defects become much less visible.)

It is accordingly the primary object of the present invention to provide an illuminating apparatus for photographic printers and enlargers wherein diffused light is employed, without, however, incurring the disadvantages of such systems as used heretofore, i.e.—without using excessive wattage and without, at the same time, obtaining only low light intensities.

Another object of my invention is the provision of a system permitting the use of relatively small and easily movable color filters whereby the color of the light with which the negative or transparency is illuminated may be adjusted by means of a mechanism readily operable by merely turning one or several dial knobs at the will of an operator without the necessity of touching the filters themselves.

More specifically, my invention provides for the use of a light collecting element (preferably, but not necessarily, a hollow body surrounding the source of light, and having a preferably specularly reflecting interior surface), and a mixing chamber which is a hollow body with a diffusely reflecting interior surface. The light collector has a relatively small orifice through which most of the available light emerges, and the mixing chamber has a first relatively small aperture, which is in juxtaposition to said orifice and through which the light enters the mixing chamber, and a second generally larger aperture through which the light illuminating the negative emerges from the mixing chamber. Small and easily adjustable color filters may be placed between the orifice and the first aperture, surrounded by a narrow housing arranged between the light collector and the mixing chamber with such filters supported by a suitable mechanism.

Another object of the present invention is the provision of an illuminating apparatus for photographic printers and enlargers which is of relatively economical cost and exceptionally efficient in its operation.

Still further objects of the present invention will become obvious to those skilled in the art by reference to the accompanying drawings wherein:

FIGURE 1 is a cross-sectional view taken along the line I—I of FIG. 2 and showing one form which the illuminating apparatus of the present invention may take, FIG. 2 is an end view looking in the direction indicated by the arrows II—II in FIG. 1, FIG. 3 is a cross-sectional view taken on the line III—III of FIG. 1 and showing one position of the color correction filters, FIG. 4 is a view identical to FIG. 3 but showing another position of the color correction filters, FIG. 5 is a cross-sectional view taken on the line V—V of FIG. 1, FIG. 6 is a cross-sectional view taken on the line VI—VI of FIG. 5, FIG. 7 is a schematic drawing showing an ellipse for purposes of illustrating the theoretical aspects of the present invention, FIG. 8 is a schematic illustration similar to FIG. 7 but showing two ellipses having a common focal point at one end and a resulting reflector formed therefrom, and FIG. 9 is a schematic illustration showing the light distribution curves obtained from rotating an elliptical reflector around its long axis compared with the light distribution from the elliptical reflector or light collector made in accordance with the present invention.

The optical system of any enlarger may be divided into two parts which comprise a first portion between light source and negative and a second portion between the negative and the enlarging lens. In the conventional condenser enlarger, the first portion has a rather low, and the second portion a rather high, efficiency (i.e.—almost all the light passing the negative also passes the enlarger lens). Conversely in a diffused light enlarger the efficiency of the second portion is low since only a fraction of the light passing the negative reaches the lens. Therefore, if a diffused enlarger is to have the same overall efficiency as a condenser enlarger, then the low efficiency of the second portion must be compensated for by improving the efficiency of the first portion, or in other words, one must employ a light collecting element that accepts much more light than the conventional condenser lens.

To produce this required efficiency the light collecting element must necessarily surround the light source in order to capture substantially all the light flux. I have found that an elliptical specular reflector (or more accurately a surface of revolution generated by rotating an ellipse around its long axis) having the filament of the illuminating lamp placed in one focal point of the ellipse and its light outlet orifice in a plane just short of its other focal point, an efficient light collector is produced which will collect about 75% of the light flux of the lamp. This compares very favorably with that of the average condenser lenses which generally collect less than 10% of the light flux even when the usual spherical reflecting mirror is placed behind the light source. Such an elliptical reflector, however, in the absence of anything further, has the disadvantage that the light distribution in the plane of its outlet orifice is very non-uniform which gives rise to difficulties in attempting to correct for off-color tone imperfections by the imposition of color correction filters in the light beam and the intensity distribution likewise affects the control of the undesirable infra-red radiations. Moreover, a really accurate elliptical reflector having a lamp filament at its first focal point would form an image of the lamp filament of the same size as the actual filament, at the plane of the second focal point.

Actually it is exceedingly difficult to produce accurate elliptical reflectors because they are made from metal spinnings or metal stampings and as a result I have noted that instead of a sharp image of the filament being produced at the plane of the other focal spot a somewhat fuzzy spot of light about one-half to one inch is produced, which I considered to be beneficial if amplified in both intensity and more uniform light distribution over the entire area of its light outlet orifice. Accordingly with the latter objective in mind I proceeded to construct the illuminating apparatus of the present invention following the theory which can best be understood by reference first to FIGS. 7, 8 and 9.

In FIG. 7 an ellipse 5 is shown partially in dotted lines 6 with the remainder in a solid line 7 and having two focal points 8 and 9 with a long or major axis, indicated by the legend "Axis of Ellipse," interconnecting these two focal points 8 and 9. Now, if the part of the ellipse 5, as shown by the solid line 7, is rotated, not about the "Axis of Ellipse" which intercepts the two focal points 8 and 9, but about an axis inclined slightly at about five degrees (5°) thereto, and as indicated by the legend "Axis of Rotation," a surface of rotation, such as a specular reflector 10 of aluminum or similar metal as shown in FIG. 8, is produced in this manner.

This specular reflector 10 (FIG. 8) or light collector 20 (FIG. 1) has an inner surface formed by the revolution of the segment 7 (FIGS. 7 and 8) of the ellipse 5, which ellipse 5 is so positioned that its major axis 8–9 intersects an axis of rotation (indicated in FIG. 7 by the legend "Axis of Rotation") at the focus 8 of the ellipse 5 at an angle of about five degrees (5°).

Referring now more specifically to FIG. 8, the filament 12 of an illuminating lamp 13 is shown positioned at the focus. If one considers, for example, an infinitesimally thin slice of the surface of revolution of reflector 10 formed by two radial planes intersecting on the imaginary "Axis of Rotation" of the generating ellipse 5 (FIG. 7), the lower portion 7 of such slice comprises, as shown in FIG. 8, a "first ellipse" with its outer focal point 9 and the upper portion 14 of such slice comprises a "second ellipse" with its outer focal point 15. If the filament 12 (FIG. 8) at the focus 8 (FIG. 7) were a point light source and the slice were a perfect ellipse, all light coming from the filament 12 and reflected by the upper portion 14 of the slice would be theoretically directed to the focal point 15 and all light coming from the filament 12 and reflected by the lower portion 7 of the slice would be theoretically directed to the focal point 9.

By considering the reflector 10 as being made up of an indefinite number of these above described infinitesimally narrow slices the resulting infinite number of point foci 9 and 15 would lie in a circle and would theoretically provide a ring focus. However, since the filament 12 is not a point light source but is a circular light source and since the infinitely narrow slices in the reflector 10 are not perfect ellipses, each infinitesimally thin slice does not produce a sharp point focus but produces a generally circular area of light. Each theoretical point focus 9 and each point focus 15 on the ring focus thus provides a corresponding circle of light, thereby resulting in an infinite number of overlapping circular lighted areas.

Hence, it will be obvious that a substantially evenly illuminated circle of light lying just short of the plane 9—15 and of the approximate diameter "d" will emanate from the outlet orifice 11 of the reflector 10 and having an approximate intensity distribution, such as shown by the curve "A" in FIG. 9. For comparison purposes the curve "B" of FIG. 9 shows the intensity distribution obtained from a reflector which is a surface of revolution generated by rotating an ellipse about its long major axis. From the foregoing it should thus be obvious that the elliptical reflector 10 of my present invention is one in which the arcuate walls, in the direction of its longest axis, are so spaced relative to such axis that light generated at a focal point at one end of the reflector, will produce a circular beam of light of substantially uniform intensity distribution over its entire area in a plane normal to the long axis just short of the opposite focal point of such reflector and constituting its light outlet orifice 11.

Having thus described the design and construction of the metallic specular reflector 10, reference may now be had to FIG. 1 wherein is shown one form which the illuminating apparatus of my present invention may take and which utilizes the above-noted reflector 10 as a light collector 20. Although the apparatus as illustrated in FIG. 1 shows two collectors 20, together with associated elements disposed 180° relative to each other, it is to be understood that these are required only in those instances where exceptionally high output is desired, such as for negatives of about 4 inches by 5 inches, but for smaller negatives of about 2¼ x 2¼ or smaller, only one collector 20 is required which thus encompasses the most popular sizes. Since both of these light collectors 20 are identical it is accordingly deemed necessary to describe only one of them in detail.

As can be seen in FIG. 1 the light collector 20 has the filament 12 of the illuminating lamp 13 disposed at the focal point as previously described, with such lamp and its associated socket encased in a light-tight housing 22 which is adapted to be connected to a suitable source of electrical energy by means of conductors 23. Inasmuch as a light collector 20, such as above described, is highly efficient in its intensity distribution not only of the visible radiations but also of infra-red radiations, it is necessary to prevent the latter from reaching the photographic negative because otherwise they will cause severe damage particularly on color films. This can occur in damage to the films themselves or the color balance of the image may be changed either temporarily or permanently. Also the heat generated by the infra-red radiations, even by a relatively small lamp (100 watts), at the plane of the outlet orifice of the light collector or in the vicinity thereof, is so intense that no heat absorbing glass will stand up for more than a few minutes without cracking.

There are presently known to be two kinds of heat absorbing glasses, one which contains certain metal oxides giving off a slightly greenish color and which is not expensive and can be readily heat treated or annealed, so that it can withstand a relatively high temperature but its heat absorbing qualities are only moderately good. The other known type of glass which has much better heat absorbing qualities contains certain phosphates making it very expensive and it is not susceptible to heat treatment, so that it can be exposed only to a relatively moderate temperature. Accordingly, in order to obtain the most efficient heat absorbing qualities to thus dissipate the heat generated by the intense infra-red radiations emanating from the light collector 20, I utilize both types of glasses.

By reference again to FIGURE 1 it will be noted that at its light outlet orifice 11, which is in a plane just short of its other focal points (points 9—15, FIG. 8) as previously described, the light collector 20 is connected to a housing 24 containing a disc of heat absorbing glass 25 of an inexpensive heat resisting but only moderately heat absorbing glass. Such glass disc 25 is disposed in the housing 24 immediately in front of the light outlet orifice 11 of the light collector 20, and is of a diameter much greater than that of such outlet orifice, with its hub portion 26 on an axis which is offset relative to the axis of the outlet orifice 11 of the light collector 20. The hub portion 26 is connected through suitable gearing or the like in a casing 27 to a small clock-type motor 28, so that the disc 25 is slowly rotated at about one revolution per minute during energization of the lamp 13, to continually dispose a new area of such heat absorbing glass in front of the light orifice 11. Accordingly, not only is the actual area that is exposed to the infra-red radiations emerging from the outlet orifice 11 in effect increased several times, but each portion of the glass disc 25 after such exposure is given considerable time due to the slow rate of rotation, to re-radiate the absorbed heat resulting in a relatively cool portion of the glass disc 25 being continuously presented to such infra-red radiations emerging from the outlet orifice 11 of the light collector 20.

Immediately in front of the rotatable glass disc 25 within the housing 24 and in axial alignment with the light outlet orifice 11 of the light collector 20 is an additional stationary disc or panel 29 of an expensive glass with excellent heat absorbing qualities but only moderately heat resistant and which has an area slightly greater than that of the outlet orifice 11 so as to completely cover the area of the latter. Thus the slowly rotating glass disc 25 absorbs enough heat to protect the second glass disc 29 from cracking and the second stationary glass disc 29 removes almost all the infra-red radiations passed by the first glass disc 25 that would otherwise damage the photographic negative or deleteriously affect the color balance. Also disposed within the housing 24 in front of the second glass disc or panel 29 are a plurality of color filters, such as a cyan filter 30, a yellow filter 32 and a magenta filter 33, each of which has an area greater than that of the light outlet orifice 11 of the light collector 20. These filters are individually operable so as to be moved one in front of the other into a position in front of the glass disc 29, to completely or partially cover the area of the light outlet orifice 11, as selected by an operator.

Although any mechanical arrangement may be employed to operate the movement of the color filters 30, 32 and 33, such as gears, belts, or the like, I show as an example a simple linkage arrangement. Such arrangement, as shown more particularly in FIGS. 3 and 4, comprises a pair of link bars 34 and 35 pivotally connected to the cyan filter 30 with the other end of the link bar 34 being rigidly connected to a shaft 36 while the opposite end of the link bar 35 is pivotally supported on a shaft 37. Accordingly, upon rotation of a control knob 38 (FIG. 6) carried by the end of shaft 36 to one of the graduations as shown in FIG. 5, the cyan filter 30 is moved into a position completely covering the light outlet orifice 11 as shown in FIGS. 1 and 3, or into a position only partially covering such orifice as can be seen in FIG. 4. In addition similar links connect the yellow filter 32 and the magenta filter 33 to the shafts 36 and 37, the only difference being that the upper link (34') connected to the yellow filter 32 and the upper link (34") connected to the magenta filter 33 are pivotally connected to these respective filters and the shaft 36, and the bottom link (35') of the yellow filter 32 is pivotally connected to the shaft 37, whereas the end of the lower link (35") of the magenta filter 33 is rigidly connected to the shaft 37 so that rotation of a control knob 39 carried by one end of such shaft to one of the graduations shown in FIG. 5 will cause movement of the magenta filter 33 into position to either completely or partially cover the light outlet orifice 11 in the same manner as above-mentioned relative to the cyan filter 30.

Since the upper and lower links 34' and 35' of the yellow filter 32, as above-mentioned, are merely pivoted to the shafts 36 and 37 and hence neither of such shafts can cause movement of the yellow filter 32, an additional shaft 40 is provided which is rotatable by a control knob 42 carried by one end thereof. A pair of control links 43 interconnects the upper link (34') of the yellow filter 32 and the shaft 40, with such control links 43 being rigidly connected to this shaft 40, thus enabling the rotation of the latter when the control knob 42 is turned to one of its graduations as shown in FIG. 5, to similarly move the yellow filter 32 into a position to either completely or partially cover the light orifice 11 in the identical manner as shown for the cyan filter 30 in FIGS. 1-3 and 4 and as above described. Thus by rotation of any one of the control knobs 38, 42 or 39 the operator can preselect the desired color filter as well as the area thereof which at any moment is placed in front of the light outlet orifice 11 (and also in front of the heat absorbing glass discs 25 and 29) so as to produce the color-tone desired during any stage of the making of a photographic print.

Again referring more specifically to FIG. 1 it will be noted that a mixing chamber 44 is connected to the housing 24 and is provided with a circular opening 45 of the same size as the outlet opening 46 of such housing 24, so that a light beam of the desired color-tone as selected by the various color filters and of uniform intensity without any appreciable infra-red radiations, is projected into the mixing chamber 44. Such mixing chamber 44 is essentially a hollow vessel of substantially spherical configuration and provided on its interior surface with a white coating, such as a diffusely reflecting non-glossy paint or the like 47. At the somewhat enlarged outlet opening 48 of the mixing chamber 44, the customary enlarging elements are secured which are well known in the art, such as the adjustable telescopic bellows 49, enlarging lens 50 and the filmholder 52 for holding the negative 53 sandwiched therebetween. Also when desired, although not strictly necessary, a light diffusing sheet of glass or plastic 54 may be placed in front of the outlet opening 48 since this sometimes improves the uniformity of the light distribution over the area of the negative 53.

Accordingly, after passing the color filters 30, 32 or 33, as the case may be, the light beam enters the mixing chamber 44 through the openings 45 and 46, where the light rays impinging upon any given point of this mixing chamber 44 are reflected in all directions, a certain portion illuminating the photographic negative 53 and another portion striking other points of the white interior surface where the rays are again reflected in all directions. This process continues until a thorough mixing of the light rays entering the mixing chamber 44 is thereby accomplished which is of utmost importance, since in most instances the color filters 30, 32 and 33 will generally cover only a portion of the openings 45—46 through which the light beam enters the mixing chamber 44 leaving the other portion uncovered. Thus the effect is that two beams of colored and non-colored light, respectively, actually enter the mixing chamber 44 and it is accordingly necessary to thoroughly mix the light rays from these two beams, so that the negative 53 is illuminated by diffused light of both uniform color and density, with the intensity of the color depending upon how deep the filter is inserted into the beam coming from the light collector 20 and entering the mixing chamber 44. In addition to the mixing of the light rays, as above-noted, the mixing chamber 44 also increases the cross-section of the light beam from the relatively narrow area, as controlled by the entrance opening 45, to the much larger area (as controlled by the opening 48) needed to illuminate the photographic negative 53.

It should thus become obvious to those skilled in the art that an illuminating apparatus for photographic enlargers and printers has been provided by the present invention wherein diffused light is produced of uniform intensity without the necessity of utilizing condensing lenses or excessive wattage and which light is thoroughly mixed to produce a preselected color-tone for illuminating the photographic negative to be printed or enlarged. Moreover, such apparatus employs a light collector and a mixing chamber which produces light rays of substantially uniform light distribution throughout its cross-sectional area and from which all infra-red radiations have been eliminated that would otherwise cause deleterious effects to the photographic negative.

Although one specific embodiment of the present invention has been shown and described, it is to be understood that in instances where additional total light intensity may be desired, such as for larger size film negatives as hereinbefore mentioned, the number of light collectors may be increased, or still further modifications of the present invention may be made without departing from the spirit and scope of the present invention.

I claim:

1. An illuminating apparatus for photographic printers and enlargers adapted to illuminate a photographic negative or transparency comprising a source of light, a light collector comprising a body defined by a hollow elliptical surface of revolution having an orifice and provided with means including an interior specular coating operable to project a major portion of the light emitted by said source of light through said orifice in the form of an extended diffused area of substantially uniform light intensity, and a mixing chamber comprising a hollow body with a diffusely reflecting interior surface and having two apertures, the first aperture being of substantially the same size as said orifice and disposed in juxtaposition thereto to admit light passing through said orifice into said mixing chamber, and the second aperture being angularly disposed relative to said first aperture and at least as large as the photographic negative or transparency and in proximity therewith whereby such photographic negative or transparency is illuminated by a beam of diffused light of high intensity through said second aperture from said mixing chamber which is substantially uniformly distributed over the area of said photographic negative or transparency.

2. An illuminating apparatus in accordance with claim 1, wherein said light collector is a hollow body defined by an elliptical surface of revolution substantially surrounding said source of light.

3. An illuminating apparatus in accordance with claim 1, wherein said light collector is a hollow body defined by an elliptical surface of revolution having a specularly reflecting interior surface and substantially surrounding said source of light.

4. An illuminating apparatus in accordance with claim 1, wherein said light collector is a body defined by a hollow elliptical surface of revolution with a specularly reflecting interior surface and in which said source of light is disposed substantially at one focal point and said orifice is disposed in close proximity to the other focal point of said elliptical surface of revolution.

5. An illuminating apparatus in accordance with claim 1, wherein said light collector is a hollow body with a specularly reflecting interior surface generated by rotating an ellipse around an angularly disposed axis of rotation in close proximity to the long axis of such ellipse and in which said source of light is disposed substantially at one focal point and the plane of said orifice is in close proximity to the other focal point of such ellipse.

6. An illuminating apparatus in accordance with claim 1, wherein said light collector is a hollow body with a specularly reflecting interior surface generated by rotating an ellipse around an axis of rotation inclined at a small angle relative to the long axis of such ellipse and which intersects the latter at one of the focal points of such ellipse, and wherein said source of light is disposed at the focal point where such axes intersect each other.

7. An illuminating apparatus in accordance with claim 1, wherein a narrow housing provided with light filters is disposed between the orifice of said light collector and the first aperture of said mixing chamber.

8. An illuminating apparatus in accordance with claim 1, wherein a narrow housing is disposed between the orifice of said light collector and the first aperture of said mixing chamber with such housing being provided with filters transparent to visible light but substantially opaque to infra-red radiation.

9. An illuminating apparatus in accordance with claim 1, wherein a narrow housing is disposed between the orifice of said light collector and the first aperture of said mixing chamber with such housing being provided with a round disk of heat absorbing glass of a diameter at least twice as large as that of said orifice and having its axis of rotation offset with respect to the center of said orifice so as to dispose only a portion of said disk in front of said orifice at any one time, and means operable to rotate said disk about its axis when said source of light is energized.

10. An illuminating apparatus in accordance with claim 1, wherein a narrow housing is disposed between the orifice of said light collector and the first aperture of said mixing chamber with such housing being provided with at least one colored filter connected to mechanism operable by an operator to adjust the position of said filter relative to said orifice.

11. An illuminating apparatus in accordance with claim 1, wherein said mixing chamber is substantially a spherical hollow body with a diffusely reflecting coating on its interior surface and having its first aperture angularly disposed relative to its second said aperture.

12. An illuminating apparatus for photographic printers and enlargers adapted to illuminate a photographic negative or transparency comprising a source of light, a light collector comprising a body defined by a hollow elliptical surface of revolution and provided with a specularly reflecting interior surface and having an orifice through which the major portion of the light emitted by said source of light is projected from said light collector, a mixing chamber comprising a hollow substantially spherical body with a diffusely reflecting interior surface and having two apertures therein angularly disposed relative to each other, the first aperture being of substantially the same size as said orifice and disposed in alignment with the latter to admit light projected through said orifice into said mixing chamber, and the second aperture being at least as large as the photographic negative or transparency and in proximity therewith whereby such photographic negative or transparency is illuminated by a beam of diffused light of high intensity passing therethrough from said mixing chamber and which is substantially uniformly distributed over the area of said photographic negative or transparency, a narrow housing disposed between the orifice of said light collector and the first aperture of said mixing chamber, infrared filters carried by said housing including a filter continuously rotatable in front of the orifice of said light collector during energization of said source of light to substantially eliminate infra-red radiations from impinging upon said photographic negative or transparency, a colored filter supported interiorly of said housing, and mechanism connected to said colored filter and operable by an operator to adjust the position of said colored filter relative to said orifice to preselect the color-tone of the diffused light illuminating said photographic negative or transparency.

References Cited in the file of this patent

UNITED STATES PATENTS

| | | |
|---|---|---|
| 1,465,626 | Craig | Aug. 21, 1923 |
| 1,970,881 | Bishop | Aug. 21, 1934 |
| 2,054,417 | Gramsa | Sept. 13, 1936 |
| 2,064,252 | Fortney | Dec. 15, 1936 |
| 2,077,740 | Caughlan | Apr. 20, 1937 |
| 2,269,494 | Tillyer | Jan. 13, 1942 |
| 2,325,350 | West | July 27, 1943 |
| 2,515,406 | Howard | July 18, 1950 |
| 2,771,001 | Gretener | Nov. 20, 1956 |
| 2,822,729 | Capatosto | Feb. 11, 1958 |